(12) United States Patent
Lenhert et al.

(10) Patent No.: US 8,382,534 B2
(45) Date of Patent: Feb. 26, 2013

(54) SYSTEM, METHOD AND APPARATUS FOR STRANDED CANTED COIL SPRING

(75) Inventors: Jon M. Lenhert, Brea, CA (US); Jay C. Cooper, Huntington Beach, CA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 70 days.

(21) Appl. No.: 12/765,299

(22) Filed: Apr. 22, 2010

(65) Prior Publication Data
US 2011/0263164 A1 Oct. 27, 2011

(51) Int. Cl.
H01R 13/33 (2006.01)

(52) U.S. Cl. ......................... 439/843; 439/930

(58) Field of Classification Search .......... 439/843, 439/840, 846, 930
See application file for complete search history.

(56) References Cited

U.S. PATENT DOCUMENTS

| 4,889,327 A | 12/1989 | Seyler |
| 4,889,496 A * | 12/1989 | Neidich ............. 439/75 |
| 4,907,788 A * | 3/1990 | Balsells ............ 267/168 |
| 4,915,366 A | 4/1990 | Balsells |
| 5,061,191 A | 10/1991 | Casciotti et al. |
| 5,139,243 A | 8/1992 | Balsells |
| 5,139,276 A | 8/1992 | Balsells |
| 6,818,076 B1 | 11/2004 | Farzin-Nia |
| 7,274,964 B2 * | 9/2007 | Balsells ............ 607/37 |
| 7,914,351 B2 * | 3/2011 | Balsells et al. ......... 439/840 |

FOREIGN PATENT DOCUMENTS

| CA | 2484536 A1 | 9/2004 |
| WO | 88/01358 A1 | 2/1988 |

OTHER PUBLICATIONS

Bal Seal Engineering; "BalContact Springs; Current Carrying Contact Elements" DM-7/DM-7M (Rev. A 621-9-1), 16 pages. Jul. 2005.
Oxford Instruments Superconducting Technology, Inc.; "Superconducting Technology" 4 pages, 2006.
Aeroflex Inernational; "Aeroflex Isolators for Shock and Vibration protection in all Environments"2M/1/2001, 28 pages.
International Search Report from PCT Application No. PCT/US2011/033644, filed Apr. 22, 2011, 1 pg.

* cited by examiner

Primary Examiner — Hien Vu
(74) Attorney, Agent, or Firm — Abel Law Group, LLP; Chi Suk Kim (57) ABSTRACT

A stranded canted coil spring for electrical contact between adjoining elements is disclosed. The spring is formed from a stranded wire having coils that define a toroid.

28 Claims, 6 Drawing Sheets

SYSTEM, METHOD AND APPARATUS FOR STRANDED CANTED COIL SPRING

BACKGROUND

1. Field of the Disclosure

The invention generally relates to canted coil springs and, in particular, to a system, method and apparatus for a stranded canted coil spring for electrical and mechanical contact between adjoining elements.

2. Description of Related Art

Conventional canted coil springs are well established for providing electrical contact and mechanical retention in various industrial configurations, such as rod-and-cylinder applications. These springs are used to pass an AC or DC electrical current through the spring between metallic components. The spring comprises a single wire that is wound into a canted coil or advanced pitch spring. Canted coil springs may be used to apply radial loads or axial loads between mating components.

Current state of the art single strand canted coil springs in electrical service have limitations of high deflected loads and resultant high linear friction, when larger diameter wires are used to conduct moderate to high electrical current densities. In addition and depending on the application and materials selected, these springs can have electrical and thermal conductivity restrictions that necessitate redundant components to meet all performance requirements for some installations. Thus, additional improvements in canted coil spring designs would be desirable for expanding their performance capabilities in alternative applications.

SUMMARY

Embodiments of an improved system, method and apparatus for a stranded canted coil spring for electrical contact between adjoining elements are disclosed. For example, in some embodiments a spring comprises a stranded wire formed from a plurality of strands of wire and configured as a canted coil or advanced pitch spring. The spring has a plurality of coils that collectively define a toroid. The stranded wire has only two axial ends that are joined together such that the stranded wire is continuous. The plurality of coils are unrestrained relative to each other, such that a periodicity of the plurality of coils is not limited or impeded by axial connection or coupling thereof. The spring may be used in an assembly or system comprising a first connector having a recess, and a second connector that locates in and engages the first connector. One or more of the stranded wires are located between the connectors.

The foregoing and other objects and advantages of the embodiments will be apparent to those skilled in the art, in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description briefly summarized above may be had by reference to the embodiments thereof that are illustrated in the appended drawings. However, the drawings illustrate only some embodiments and therefore are not to be considered limiting of its scope as the invention may admit to other equally effective embodiments.

The use of the same reference symbols in different drawings indicates similar or identical items.

DETAILED DESCRIPTION

Figure 1:
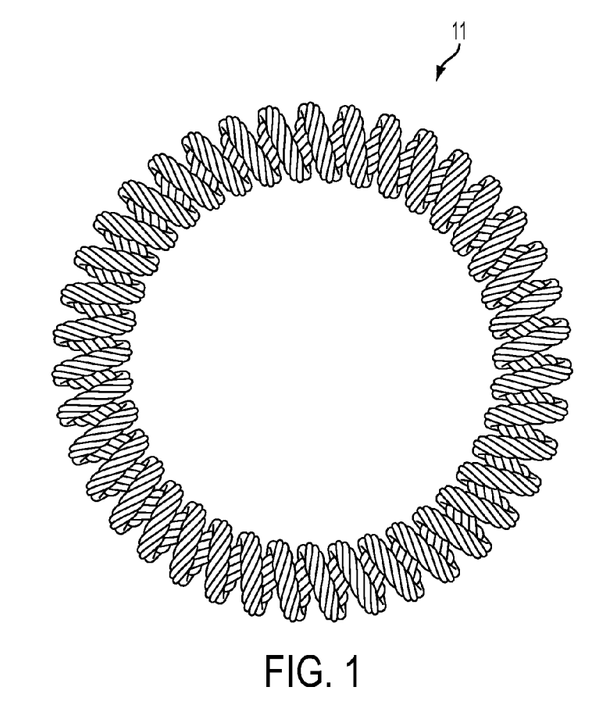
FIG. 1 is a front view of one embodiment of a stranded canted coil spring.
Figure 2:
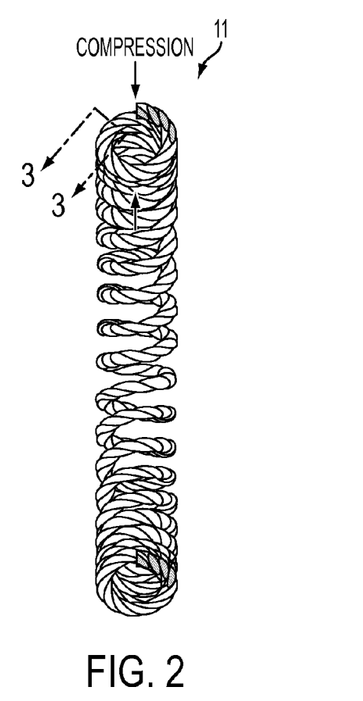
FIG. 2 is a partial side view of an embodiment of the stranded canted coil spring of FIG. 1, under radial compression.
Figure 7:
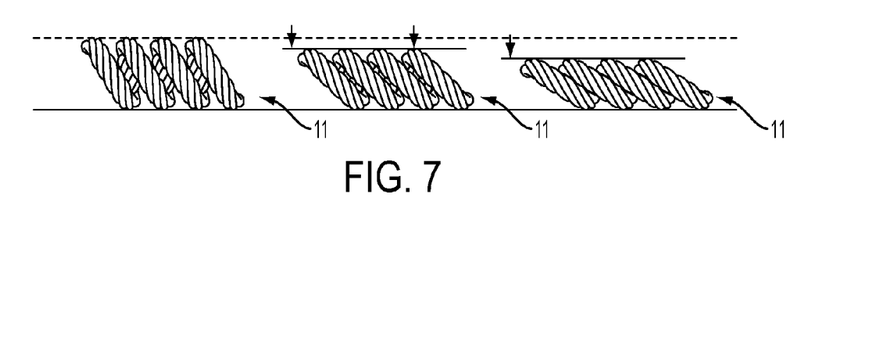
FIG. 7 is a side view of a linear spring under different loads and deflection.

Embodiments of an improved system, method and apparatus for a stranded, advanced pitch spring (APS) or canted coil spring that provides electrical contact and mechanical engagement between adjoining elements are disclosed. For example, in the illustrated embodiment of FIGS. 1, 2 and 3A, the canted coil spring 11 may comprise a toroid of polyfilament wire formed from seven strands 13 of wire filaments. In some embodiments, all of the coils are canted or advanced off-axis in one direction and at the same angle of inclination. See, e.g., FIG. 1. Embodiments also include straight springs (see, e.g., FIG. 7) that are linear and cut to length. The spring 11 may be placed under radial compression (FIG. 2) or axial compression (FIG. 4).

Compared to conventional single-stranded coils, the characteristic load versus deflection curves are dramatically changed, and the load for any given deflection is greatly reduced. The lower forces provided by stranded coils enables the use of a coil with a much larger overall diameter, and a proportional increase of cross-sectional area metal within the stranded wire. The larger area of the stranded coil inversely lowers the electrical resistance for any given spring application. Thus, stranded coils with low spring loads and electrical characteristics rivaling heavier wires are achievable. Alternatively, stranded springs providing equal loads with heavier or thicker stranded wires having much lower electrical resistance also are available.

For example, a conventional single-strand, canted coil spring having a single strand diameter of 0.010 inches is formed from 302 stainless steel spring wire. That wire is wound into an oval geometry having a minor axis diameter of 0.133 inches, and a major axis diameter of 0.146 inches. This single strand, canted coil spring develops about 0.15 to 0.20 pounds of force (Lbf) per inch of axial length of the spring when compressed down to a radial thickness of 0.100 inches (compare, e.g., FIG. 7).

Figure 3A:
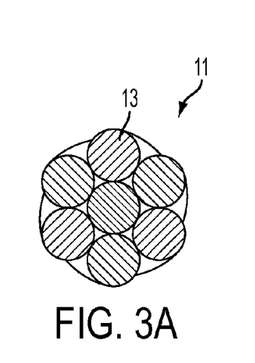
FIGS. 3A-3I are sectional end views of different embodiments of the stranded canted coil spring of FIG. 1, taken along the line 3-3 of FIG. 2.
Figure 4:
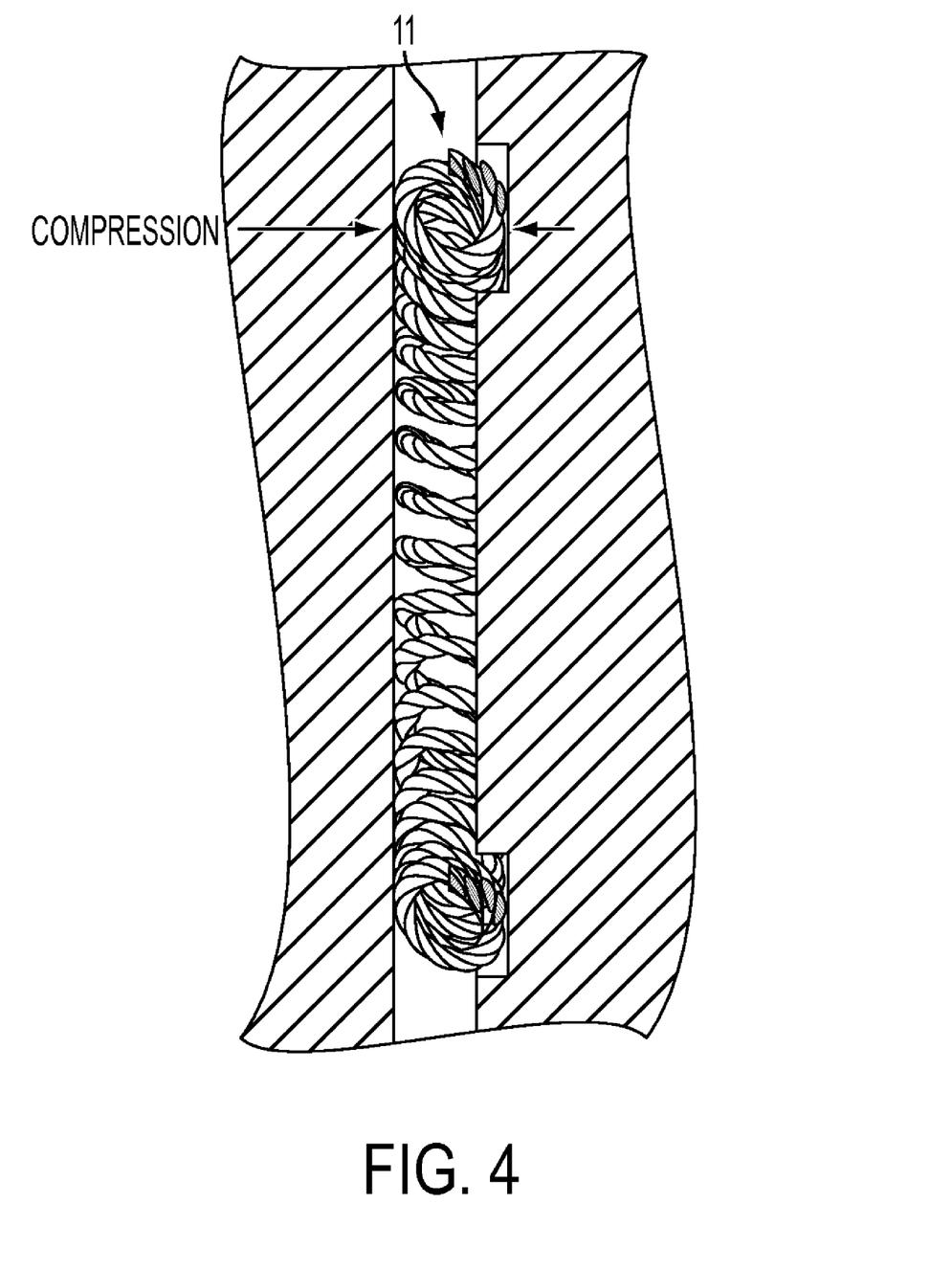
FIG. 4 is a partially-sectioned side view of an embodiment of an assembly and system for a stranded canted coil spring, under axial compression.

For comparison, and in accordance with some embodiments, the same spring form factor is used but formed with seven (7) strands of wire filaments (FIG. 3A). Each strand may be provided with a diameter of 0.005 inches, and the spring has an overall diameter of 0.015 inches. The approximately 0.16 Lbf/in load provided by this spring is in the same range as the single strand spring, but the cross-sectional area of the conductor is increased from 7.58E-5 in$^2$ (for the single strand spring) to 1.37E-4 in$^2$ (for the 7-strand spring). This is an increase in area of about 80%, which also equates to an inverse drop in electrical resistance and, thus, a greater electrical amperage capacity.

Figure 3B:
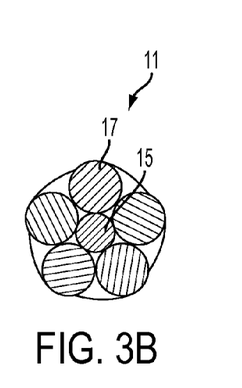

In other embodiments, more or fewer strands of filaments may be used, such as stranded wires comprising 4, 5, 9, 11, 13, 15 or 17-strands. These embodiments also provide lower loads than conventional canted coil springs. Moreover, all of the strands or filaments do not have to be the same size. For example, FIG. 3B depicts another embodiment of spring 11 having a relatively smaller central filament 15 (e.g., 0.005 inch diameter) surrounded by five relatively larger diameter filaments 17 (e.g., 0.007 inch diameter).

Figure 3C:
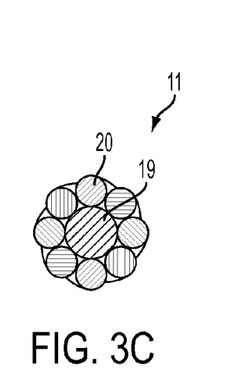
Figure 3D:
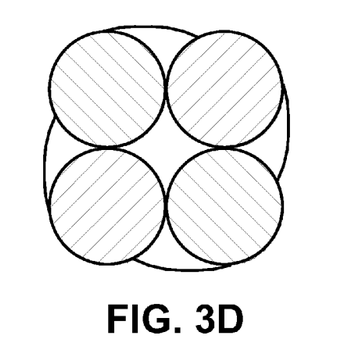
Figure 3E:
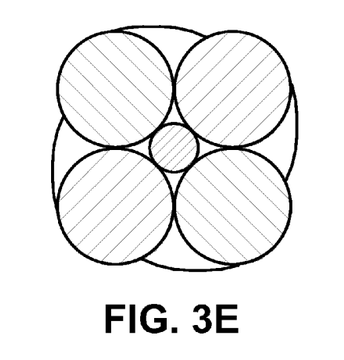
Figure 3F:
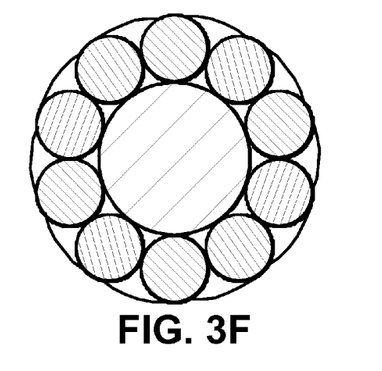
Figure 3G:
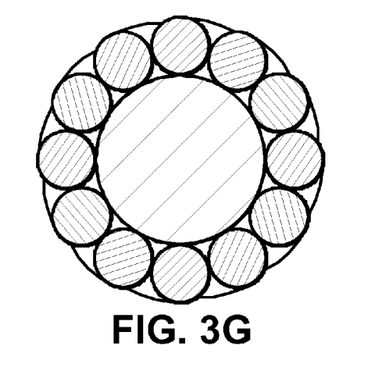
Figure 3H:
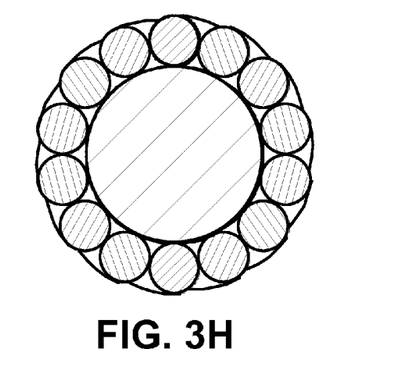
Figure 3I:
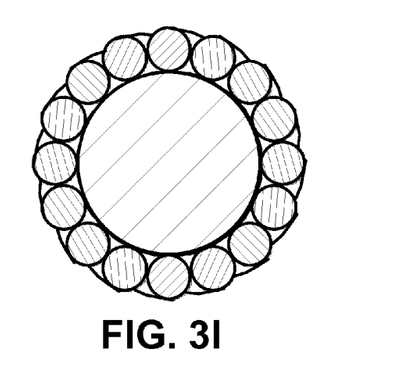

Alternatively, FIG. 3C depicts an embodiment of spring 11 where a relatively larger central filament 19 (e.g., 0.005 inch diameter) is surrounded by seven or eight relatively smaller diameter filaments 20 (e.g., 0.004 or 0.003 inch diameters, respectively). FIG. 3D depicts an embodiment of spring 11 having 4 strands of wire. FIG. 3E depicts an embodiment of spring 11 having 5 strands of wire. FIG. 3F depicts an embodiment of spring 11 having 11 strands of wire. FIG. 3G depicts an embodiment of spring 11 having 13 strands of wire. FIG. 3H depicts an embodiment of spring 11 having 15 strands of wire. FIG. 3I depicts an embodiment of spring 11 having 17 strands of wire. Furthermore, various embodiments of the center and surrounding filaments may be formed from different materials in some embodiments, such as stainless steel and silver, respectively, for improved load/strength and electrical conductivity.

In still other embodiments, the spring filaments may be formed from superconductive materials, such as for cryogenic applications. For example, the springs may comprise woven cables of niobium-tin, niobium-titanium, yttrium-boron-cobalt wires and copper or bronze. Embodiments of a multi-filament spring may further comprise superconducting alloy outer wires woven around a resilient/force creating high modulus metal core filament to form a matching electrical characteristic connector as described herein. The spring also may be formed with magnesium diboride filaments, which may require an air tight sheath to reduce oxidation.

Applications for these types of stranded springs may include superconducting magnets used for magnetic resonance imaging (MRI), nuclear magnetic resonance (NMR) research and NMR spectroscopy, industrial and lab magnetics, particle accelerators, and magnetic energy storage. MRI and NMR use fast capacitive current dumps through a damped magnet to create a fast magnetic pulse or "ping," that sounds like a single strike on a xylophone bar. This pulse is on the order of thousands of amperes, creating strong magnetic fields of about 1 to 23+ Teslas. The signal emissions from the nuclei, atoms, and molecules are characteristic to mass, composition, and structure.

In some embodiments for a given gland in which the spring is seated, and a given assembly/disassembly friction or spring contact force, the spring has a greater cross-sectional area of conductor. This lowers the electrical resistance of the spring, increases electrical current transfer, and increases thermal conductivity. For many applications, these parameters are superior to springs formed from only a single strand of wire.

In other embodiments, for a fixed hardware constraint and fixed electrical amperage capacity, the spring in develops far less compression force and sliding friction than a single-stranded spring. For any given equal compression force, the net stress in the stranded spring's individual wires is lower, and more evenly distributed, than a single-stranded spring. This design increases fatigue life for these low stress, advanced pitch, poly-filament springs.

Figure 5A:
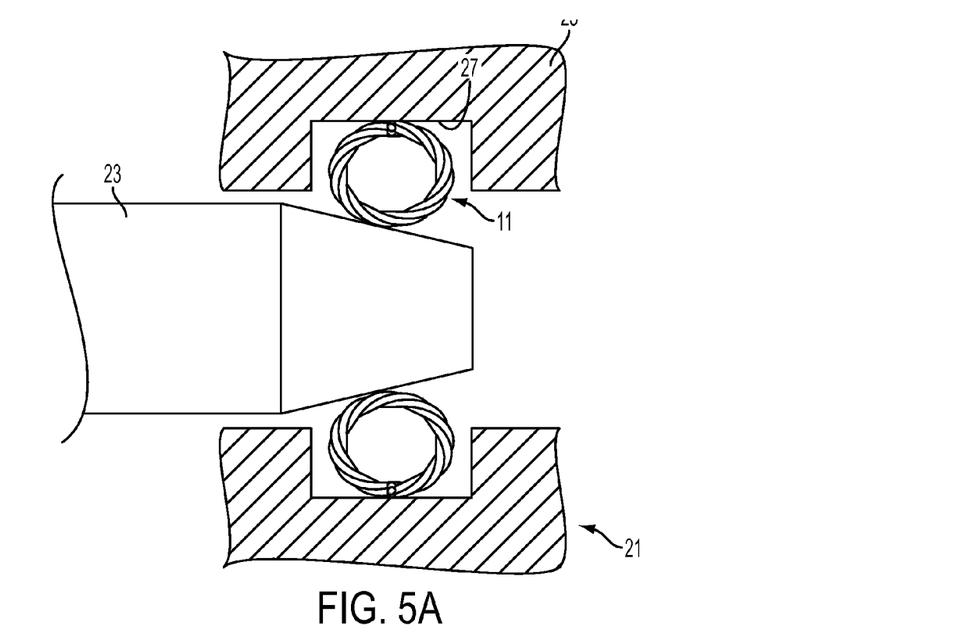
FIGS. 5A and 5B are partially-sectioned side views of another embodiment of an assembly and system for a stranded canted coil spring.
Figure 5B:
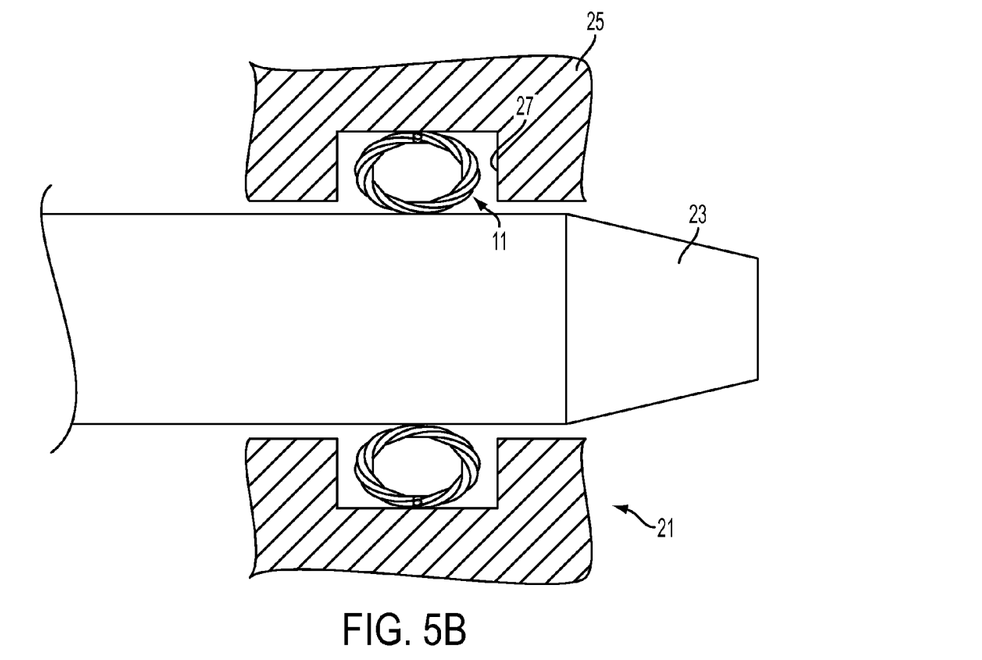

FIGS. 5A and 5B depict an embodiment of one type of application for a connector system 21. For example, a rod 23 having a diameter of 0.5 inches is matched with a bore connector 25 having a gland 27 in which a stranded canted coil spring 11 is located. This application may be found on, for example, large water pumps or air conditioning systems.

The half-inch copper rod may be connected to a 500 mcm cable having a 0.519 inch diameter. Based on an electrical load capacity of 1,713 amps/in$^2$, the constant duty ampere rating is 889 amps. This rating is easily tripled for starting large 3-phase motors, and multiplied six times for single-phase motor draws. Motor starts usually last about one to ten seconds in time duration. Most commercial circuit breakers allow for this requirement.

A conventional, single-stranded canted coil spring that is suitable for this application is formed from common C17200 alloy material, has a solid or single strand diameter of 0.014 inches, and a wire cross-sectional area of 1.54E-04 in$^2$. To use this spring, the gland or groove is about 0.09 inches deep, which provides for about 25% compression of the spring. The spring has 46 coils to fit the groove properly. This conventional spring develops a compression load of 4.9 Lbf/in, for a total of 6.65 Lbf in this application. In other words, assuming a 1.0 coefficient of friction, the rod needs 6.65 Lbf to slide with one spring between the rod and bore.

The 46 coils of the conventional spring handle 46×27.7 amps/coil, or about 1,274 amps. To properly size the connector to handle about three to 3.5 times the running current for starting, two of these conventional springs are required for this application, side-by side, which provides a net linear friction of over 13 Lbf.

In contrast, embodiments of a stranded spring may be substituted to increase power capacity of the installation. For example, a seven-stranded spring has seven filaments of wire, each of which has a diameter of 0.008 inches. This stranded wire spring has the same height and width as the other spring, and develops a load of 12.7 Lbf. However, the stranded spring has an overall cross-sectional area of 3.52E-4 in$^2$ of conductor area, which is more than double that of the single-stranded spring. Accordingly, only one groove and one spring are required for the stranded installation, with the same per-spring friction, a smaller connector, and less machining advantageously being required.

Substituting a higher performing alloy (e.g., C18150) increases the power capacity of the single-stranded spring from 27.7 amps/coil to 44.6 amps/coil. Making the same material substitution in the stranded spring likewise increases its ampacity by the same percentage amount. In another example, using niobium-titanium or niobium-tin bronze outer wires and immersing in liquid helium increases ampacity by another 200 fold.

In an alternate embodiment, the electrical current capacity is kept about the same as the conventional springs, but changing the frictional performance. The conventional spring uses a single wire with a diameter of 0.014 inches, and creates 6.65 Lbf sliding friction force per spring. To meet the surge ampere capacity of this particular example, two of the conventional springs are needed. Replacing those two conventional springs with a pair of stranded springs having 7-strands of 0.006 inches diameter per strand, yields an area of 1.97E-4 in$^2$. Since the stranded springs have more area but a lighter force, the 3-second power load requirement is satisfied. The lighter contact of the stranded springs adds heat, but they balance that with the lower electrical resistance and better thermal transfer.

Using a pair of springs each having 7-strands with 0.006 inch diameters reduces the friction to 0.79 Lbf/in, or about one-seventh of the friction of the single-stranded springs. Thus, these embodiments provide an equal power capacity joint with a much lower friction load. Similarly, a spring having 7-strands with 0.005 inch diameters has the same cross-sectional area as a solid or single-stranded, 0.013 inch diameter spring. Made into equal size springs and at 25% deflection, the multi-stranded spring develops 0.16 Lbf/in of force, compared to 2.5 Lbf/in of force for the single-strand spring.

Figure 8:
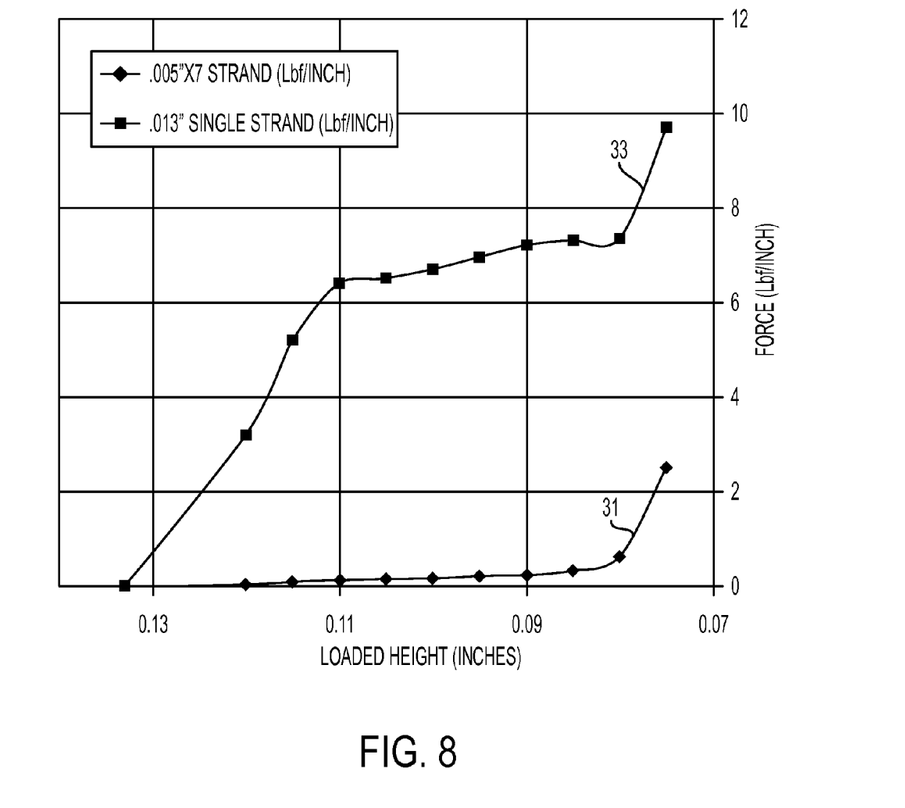
FIG. 8 is a plot of load versus deflection comparing the performances of an embodiment of a stranded canted coil spring and a conventional canted coil spring.

FIG. 8 depicts plots of load and deflection, for equal cross-sectional area springs of the same geometry and stainless steel material. The plot 31 for the multi-stranded spring has an area of 0.0001374 in$^2$, and the plot 33 for the solid core wire has an almost identical area of 0.0001327 in$^2$. The areas are very similar but there is an enormous difference in load. For example, for identical spring geometries of 0.133×0.146 inches (i.e., the dimensions of the minor and major axes of the oval spring form factor), over various wire diameters yields the following data:

| Loaded Height (inches) | .005" × 7 Strands (Lbf/inch) 0.0001374 in$^2$ | 0.013" Single Strand (Lbf/inch) 0.0001327 in$^2$ |
|---|---|---|
| 0.12 | 0.032 | 3.2 |
| 0.115 | 0.08 | 5.2 |
| 0.11 | 0.113 | 6.4 |
| 0.105 | 0.143 | 6.5 |
| 0.1 | 0.159 | 6.7 |
| 0.095 | 0.199 | 6.95 |
| 0.09 | 0.218 | 7.2 |
| 0.085 | 0.318 | 7.3 |
| 0.08 | 0.614 | 7.35 |
| 0.075 | 2.5 | 9.7 |

Accordingly, when the force per unit area of these springs is normalized, the multi-stranded spring yields a surprisingly broad range of force. For example, under the minimal loaded height of 0.12 inches, the stranded spring produces 0.032 Lbf/in. When that force is divided by the area of the multi-stranded spring (i.e., 0.032÷0.0001374), it has a normalized force of about 233 Lbf/in/in$^2$. At the upper end of 0.075 inches, the stranded spring produces 2.5 Lbf/in. When divided by the area of the multi-stranded spring (i.e., 2.5÷0.0001374), it has a normalized force of about 18,195 Lbf/in/in$^2$, or about 200 to 20,000 Lbf/in/in$^2$. This provides a force variance of about 7800% over the operational range of the multi-stranded spring (e.g., in excess of 7000% force variance).

In stark contrast, under the minimal loaded height of 0.12 inches, the solid core spring produces 3.2 Lbf/in. When that force is divided by the area of the solid core spring (i.e., 3.2÷0.0001327), it has a normalized force of about 24,114 Lbf/in/in$^2$. At the upper end of 0.075 inches, the single strand spring produces 9.7 Lbf/in, and when divided by its area (i.e., 9.7÷0.0001327), it has a normalized force of about 73,097 Lbf/in/in$^2$, which is about a 300% variance in force over the operational range of the single-stranded spring.

Thus, for similar areas the loads are vastly different. Likewise for similar loads, the areas are vastly different. In another example, one application typically uses a conventional spring having a solid wire with a diameter of 0.013 inches. The application, however, requires lower friction, but the same electrical conductivity or better than the single wire can provide. Using a multi-stranded, 0.005×7 spring provides conductivity like a solid 0.013 diameter wire, but the force/friction is much lower and equal to a single stranded 0.008 inch diameter spring at only 0.27 Lbf/in of force. Alternatively, a multi-stranded spring having 0.006×7 strands, provides lower electrical resistance and lower friction. Other examples are provided below for comparison of performance.

| Wire [diam (in) × strand(s)] | Area [in$^2$] | Load @ 0.090 inches of deflection [Lbf/in] |
|---|---|---|
| 0.013 × 1 | 1.327E−4 | 7.2 |
| 0.005 × 7 | 1.374E−4 | 0.2 |
| 0.008 × 1 | 5.027E−5 | 7.6 |
| 0.010 × 7 | 5.498E−4 | 0.3 |

As another example, some applications require the same sliding friction and load as a solid 0.013 inch diameter spring, but the best possible electrical conductivity and highest current capacity. The multi-stranded, 0.010×7 spring has 4.1 times the cross-sectional area as a conventional solid 0.013 inch diameter spring, but the same load and friction. The thermal conductivity also is much greater for the multi-stranded spring, so the ampacity increases by about 500%.

Figure 6A:
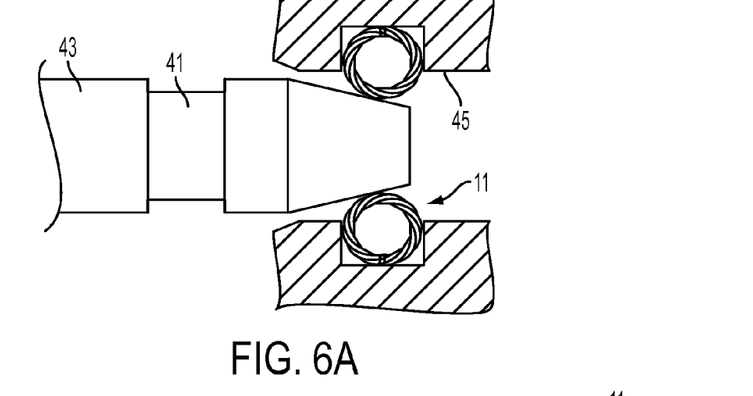
FIGS. 6A-C are partially-sectioned side views of still another embodiment of an assembly and system for a stranded canted coil spring.
Figure 6B:
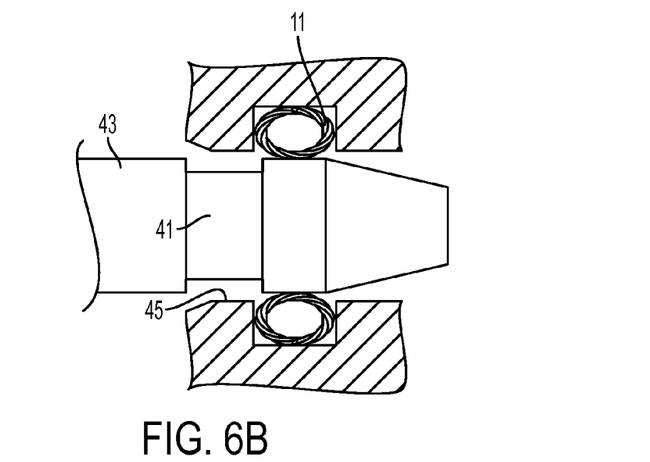
Figure 6C:
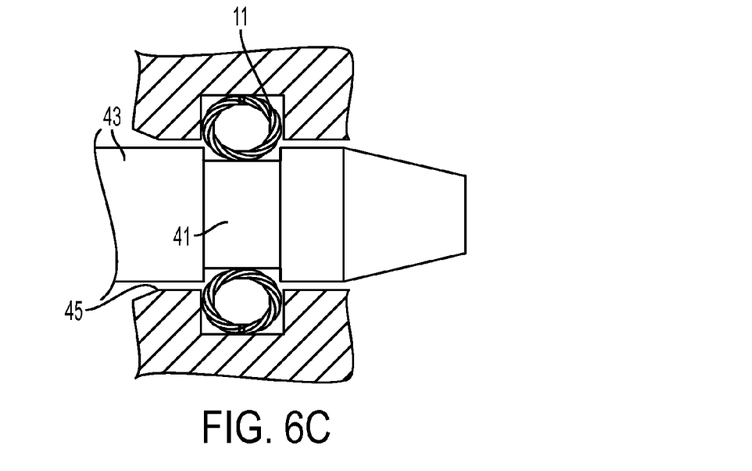

In still another example, a hybrid truck battery rapid disconnect connector, or electric arc welder connector, has a solid copper male/female connector with 8 mm diameters. As shown in FIGS. 6A-C, the canted coil springs 11 are contained in a groove 41 on the rod 43 inside a connector bore 45. The springs are required to perform at 800 amperes continuous, and surges to 2,100 amps for three seconds.

A conventional solution to this particular application is to use a C18150 alloy spring having a 0.011 inch diameter, solid core wire. The area of this spring is 9.5E-5 in$^2$, and the load is 4.7 Lbf./in. This spring is rated at 28.5 amps per coil for 3 seconds. There are 33 coils in one spring, yielding 33 coils× 28.5 amps/coil=940 amperes per spring. Thus, three of these conventional springs are needed, side-by-side, to handle the peak demand. Each spring develops about 3.8 Lbf sliding friction, or a total of about 11.4 Lbf to push the connector together.

In contrast, a multi-stranded spring, formed from the C18150 alloy, having 0.007 inch diameter×7-strands may be used. This spring has an area of 2.7E-4 in$^2$, and a load of 5.1 Lbf/in, or about 4 Lbf total. The multi-stranded spring has 2.84 times the conductor area of the solid spring, so only one multi-stranded spring is required. This solution provides a lower friction force, is easier to assemble, and is less expensive due to less machining for the single groove, and the connector is shorter in overall length, which saves materials and manufacturing time.

Thus, these embodiments are well suited for applications having fixed limit dimensions, a need for lower electrical resistance, and/or increased thermal conductivity. Those advantages are provided by increasing the cross-sectional area of the conductive metal without increasing forces and load. Alternatively, these embodiments reduce friction without increasing electrical resistance.

In some embodiments, the spring comprises a stranded wire formed from a plurality of strands of wire and is configured as a canted coil or advanced pitch spring. The spring has a plurality of coils that collectively define a toroid. The stranded wire has only two axial ends that are joined or welded together such that the stranded wire is continuous. The plurality of coils are unrestrained relative to each other such that a periodicity of the plurality of coils is not limited or impeded by axial connection or coupling of the plurality of coils. The stranded wire provides about 200 to 20,000 Lbf/in/in², in some embodiments. The stranded wire also provides a force variance of over 7000% (e.g., about 7800%) over an operational range of the spring.

In some embodiments, at least one of the plurality of strands is formed at a diameter that differs from a diameter of other ones of the plurality of strands. The stranded wire may be formed with a central strand with a relatively smaller diameter, and the central strand is surrounded by surrounding strands having a relatively larger diameter. For example, the relatively smaller diameter may be 0.005 inches, and the relatively larger diameter may be 0.007 inches. The stranded wire also may be faulted with a central strand with a relatively larger diameter, and the central strand is surrounded by surrounding strands having a relatively smaller diameter. For example, the relatively smaller diameter may be 0.003 or 0.004 inches, and the relatively larger diameter may be 0.005 inches.

In other embodiments, at least one of the plurality of strands is formed from a material that differs from a material used to form other ones of the plurality of strands. For example, the stranded wire may have a central strand formed from stainless steel, and the central strand is surrounded by surrounding strands formed from silver. In still other embodiments, at least one of the strands is formed from a superconductive material.

Some embodiments also comprise an assembly or system comprising a first connector (e.g., inner, outer or axial) having a recess that circumscribes the inner or outer surfaces thereof. A second connector has a second recess, and the stranded wire is located in the recesses of the connectors.

Using a multi-stranded wire for a canted coil spring has numerous advantages, including lowering the electrical path resistance by nearly half, while maintaining an equivalent force load for a given spring size envelope. For same-diameter springs, stranded springs also greatly reduce the force load while maintaining an equivalent electrical path resistance and spring size envelope.

In mechanical aspects, the deflection stresses that build up in the multi-stranded springs also are substantially lower than those in single-stranded springs. The multi-stranded springs thus have a mechanical advantage in fatigue cycles. Multi-stranded springs also suppress electromagnetic and radio frequency interference (EMI/RFI) signals.

This written description uses examples to disclose the embodiments, including the best mode, and also to enable those of ordinary skill in the art to make and use the embodiments. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical connector having a spring, the spring comprising:
   a stranded wire formed from a plurality of conductive strands of wire and configured as a canted coil spring having a plurality of coils that collectively define a toroid, the stranded wire having axial ends that are joined together such that the stranded wire is continuous, wherein the stranded wire provides about 200 to 20,000 Lbf/in/in² and wherein the stranded wire has a central conductive strand with a relatively smaller diameter, and the central strand is surrounded by surrounding conductive strands and each surrounding conductive strand has a relatively larger diameter than the central conductive strand.

2. A spring according to claim 1, wherein the plurality of strands comprises seven strands of wire.

3. A spring according to claim 1, wherein the plurality of strands comprises 4, 5, 9, 11, 13, 15 or 17 strands of wire.

4. A spring according to claim 1, wherein the stranded wire provides a force variance of over 7000% over an operational range of the spring.

5. A spring according to claim 4, wherein the force variance is about 7800% over the operational range of the spring.

6. A spring according to claim 1, wherein at least one of the plurality strands is formed at a diameter that differs from a diameter of other ones of the plurality of strands.

7. A spring according to claim 1, wherein the relatively smaller diameter is 0.005 inches, and the relatively larger diameter is 0.007 inches.

8. A spring according to claim 1, wherein the relatively smaller diameter is 0.003 or 0.004 inches, and the relatively larger diameter is 0.005 inches.

9. A spring according to claim 1, wherein at least one of the plurality of strands is formed from a first material that differs from a second material used to form other ones of the plurality of strands.

10. A spring according to claim 1, wherein the stranded wire has a central strand formed from stainless steel, and the central strand is surrounded by surrounding strands formed from silver.

11. A spring according to claim 1, wherein at least one of the strands is formed from a superconductive material.

12. A spring according to claim 1, wherein the stranded wire has only two axial ends that are welded together such that the stranded wire is continuous, and the plurality of coils are unrestrained relative to each other such that a periodicity of the plurality of coils is not limited or impeded by axial connection or coupling of the plurality of coils.

13. An electrical connector assembly, comprising:
   a first electrical connector having a recess formed therein;
   a second electrical connector having a second recess formed therein;
   a stranded wire located in the recess and second recess between the first and second connectors, the stranded wire having a plurality of strands of conductive strands of wire and configured as a canted coil spring having a plurality of coils that collectively define a toroid, the stranded wire having axial ends that are joined together such that the stranded wire is continuous, wherein the stranded wire provides about 200 to 20,000 Lbf/in/in² and wherein the stranded wire has a central conductive strand with a relatively smaller diameter, and the central strand is surrounded by surrounding conductive strands and each surrounding conductive strand has a relatively larger diameter than the central conductive strand.

14. An assembly according to claim 13, wherein the plurality of strands comprises seven strands of wire.

15. An assembly according to claim 13, wherein the plurality of strands comprises 4, 5, 9, 11, 13, 15 or 17 strands of wire.

16. An assembly according to claim 13, wherein the stranded wire provides a force variance of over 7000% over an operational range of the spring.

17. An assembly according to claim 16, wherein the force variance is about 7800% over the operational range of the spring.

18. An assembly according to claim 13, wherein at least one of the plurality strands is formed at a diameter that differs from a diameter of other ones of the plurality of strands.

19. An assembly according to claim 13, wherein the relatively smaller diameter is 0.005 inches, and the relatively larger diameter is 0.007 inches.

20. An assembly according to claim 13, wherein the relatively smaller diameter is 0.003 or 0.004 inches, and the relatively larger diameter is 0.005 inches.

21. An assembly according to claim 13, wherein at least one of the plurality of strands is formed from a first material that differs from a second material used to form other ones of the plurality of strands.

22. An assembly according to claim 13, wherein the stranded wire has a central strand formed from stainless steel, and the central strand is surrounded by surrounding strands formed from silver.

23. An assembly according to claim 13, wherein at least one of the strands is formed from a superconductive material.

24. An assembly according to claim 13, wherein the stranded wire has only two axial ends that are welded together such that the stranded wire is continuous, and the plurality of coils are unrestrained relative to each other such that a periodicity of the plurality of coils is not limited or impeded by axial connection or coupling of the plurality of coils.

25. An electrical connector having a spring, the spring comprising:
a stranded wire formed from a plurality of conductive strands of wire and configured as a canted coil spring having a plurality of coils that collectively define a toroid, the stranded wire having axial ends that are joined together such that the stranded wire is continuous, wherein the stranded wire provides about 200 to 20,000 Lbf/in/in$^2$ and wherein the stranded wire has a central conductive strand with a relatively larger diameter, and the central strand is surrounded by surrounding conductive strands and each surrounding conductive strand has a relatively smaller diameter than the central conductive strand.

26. An electrical connector having a spring, the spring comprising:
a stranded wire formed from a plurality of conductive strands of wire and configured as a canted coil spring having a plurality of coils that collectively define a toroid, the stranded wire having axial ends that are joined together such that the stranded wire is continuous, wherein the stranded wire provides about 200 to 20,000 Lbf/in/in$^2$ and wherein the stranded wire has a central conductive strand with a diameter and the central strand is surrounded by surrounding conductive strands and each surrounding conductive stand has a diameter that is substantially equal to the diameter of the central conductive strand.

27. An electrical connector assembly, comprising:
a first electrical connector having a recess formed therein;
a second electrical connector having a second recess formed therein;
a stranded wire located in the recess and second recess between the first and second connectors, the stranded wire having a plurality of strands of conductive strands of wire and configured as a canted coil spring having a plurality of coils that collectively define a toroid, the stranded wire having axial ends that are joined together such that the stranded wire is continuous, wherein the stranded wire provides about 200 to 20,000 Lbf/in/in$^2$ and wherein the stranded wire has a central conductive strand with a relatively larger diameter, and the central strand is surrounded by surrounding conductive strands and each surrounding conductive strand has a relatively smaller diameter than the central conductive strand.

28. An electrical connector assembly, comprising:
a first electrical connector having a recess formed therein;
a second electrical connector having a second recess formed therein;
a stranded wire located in the recess and second recess between the first and second connectors, the stranded wire having a plurality of strands of conductive strands of wire and configured as a canted coil spring having a plurality of coils that collectively define a toroid, the stranded wire having axial ends that are joined together such that the stranded wire is continuous, wherein the stranded wire provides about 200 to 20,000 Lbf/in/in$^2$ and wherein the stranded wire has a central conductive strand with a diameter, and the central strand is surrounded by surrounding conductive strands and each surrounding conductive strand has a diameter that is substantially equal to the diameter of the central conductive strand.

* * * * *